United States Patent
Zhang

(10) Patent No.: US 9,883,243 B2
(45) Date of Patent: Jan. 30, 2018

(54) INFORMATION PROCESSING METHOD AND ELECTRONIC APPARATUS

(71) Applicant: LENOVO (BEIJING) CO., LTD., Beijing (CN)

(72) Inventor: Bo Zhang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/459,477

(22) Filed: Aug. 14, 2014

(65) Prior Publication Data

US 2015/0243327 A1    Aug. 27, 2015

(30) Foreign Application Priority Data

Feb. 26, 2014  (CN) .......................... 2014 1 0067007

(51) Int. Cl.
*H04N 7/173* (2011.01)
*H04N 21/472* (2011.01)
*G11B 27/00* (2006.01)
*H04N 21/6587* (2011.01)
*H04N 21/435* (2011.01)
(Continued)

(52) U.S. Cl.
CPC ..... *H04N 21/47202* (2013.01); *G11B 27/005* (2013.01); *H04N 21/2353* (2013.01); *H04N 21/23418* (2013.01); *H04N 21/435* (2013.01); *H04N 21/44008* (2013.01); *H04N 21/6587* (2013.01); *H04N 21/8133* (2013.01)

(58) Field of Classification Search
CPC ......... H04N 21/47202; H04N 7/17336; H04N 7/17318; H04N 21/6587; H04N 21/2387

USPC ...................... 725/87–89; 709/219, 229, 231
See application file for complete search history.

(56) References Cited

U.S. PATENT DOCUMENTS 5,003,384 A * 3/1991 Durden ................ G06Q 20/145
                                                        348/E7.063
5,311,325 A * 5/1994 Edwards ................... H04K 3/41
                                                        340/5.74
(Continued)

FOREIGN PATENT DOCUMENTS

CN          1784898          6/2006

OTHER PUBLICATIONS

Chinese Patent Application 2014100670075, Chinese Patent Office, First Office Action dated Aug. 3, 2016; 16 pages.
(Continued)

*Primary Examiner* — Annan Shang
(74) *Attorney, Agent, or Firm* — Dentons US LLP

(57) ABSTRACT

The present invention discloses an information processing method applied in an electronic apparatus, and the method includes deciding whether a first condition is satisfied when the electronic apparatus plays the first data; switching from a first moment of the first data to a second moment of the first data if result of decision indicates that the first condition is satisfied, the second moment and the first moment constituting a first time interval; deciding whether a second condition is satisfied; switching a third moment of the first data to a fourth moment of the first data if result of decision indicates that the second condition is satisfied, the fourth moment and the third moment constituting the second time interval; wherein the first condition is the same as the second condition, and the first time interval is different from the second time interval.

20 Claims, 2 Drawing Sheets

(51) Int. Cl.
*H04N 21/44* (2011.01)
*H04N 21/235* (2011.01)
*H04N 21/234* (2011.01)
*H04N 21/81* (2011.01)

(56) References Cited

U.S. PATENT DOCUMENTS

| | | | | |
|---|---|---|---|---|
| 5,592,551 | A * | 1/1997 | Lett | G06K 7/0047 348/E7.056 |
| 6,701,528 | B1 * | 3/2004 | Arsenault | H04N 7/17336 348/E7.073 |
| 6,907,570 | B2 * | 6/2005 | Amir | G06F 17/30017 707/E17.009 |
| 7,373,650 | B1 * | 5/2008 | Rodriguez | H04N 5/44591 348/565 |
| 7,486,873 | B2 * | 2/2009 | Kim | G06F 17/30852 386/248 |
| 7,506,356 | B2 * | 3/2009 | Gupta | G06F 17/241 725/116 |
| 7,540,009 | B1 * | 5/2009 | Bryant | H04N 7/163 725/136 |
| 8,782,267 | B2 * | 7/2014 | Gilson | H04N 5/765 386/241 |
| 8,959,540 | B1 * | 2/2015 | Gargi | H04N 21/251 725/19 |
| 2003/0122966 | A1 * | 7/2003 | Markman | G11B 27/105 348/563 |
| 2004/0034870 | A1 * | 2/2004 | O'Brien | H04N 7/17336 725/88 |
| 2005/0005308 | A1 * | 1/2005 | Logan | G06Q 30/06 725/135 |
| 2005/0022246 | A1 * | 1/2005 | Kung | H04N 7/17336 725/90 |
| 2005/0195978 | A1 * | 9/2005 | Babic | G06F 21/10 380/231 |
| 2005/0238316 | A1 * | 10/2005 | MacDonald Boyce | G11B 27/105 386/330 |
| 2006/0123484 | A1 * | 6/2006 | Babic | G06F 21/10 726/26 |
| 2006/0126556 | A1 * | 6/2006 | Jiang | H04L 12/18 370/328 |
| 2007/0062362 | A1 * | 3/2007 | Hemmingson | B23D 61/06 83/830 |
| 2007/0157267 | A1 * | 7/2007 | Lopez-Estrada | H04N 21/23424 725/90 |
| 2008/0155616 | A1 * | 6/2008 | Logan | G06F 17/30053 725/93 |
| 2008/0229371 | A1 * | 9/2008 | Mick | G06F 21/10 725/87 |
| 2009/0119723 | A1 * | 5/2009 | Tinsman | H04N 7/165 725/87 |
| 2010/0199295 | A1 * | 8/2010 | Katpelly | G06F 17/30053 725/14 |
| 2012/0070129 | A1 * | 3/2012 | Lin | H04N 21/234327 386/278 |
| 2014/0143799 | A1 * | 5/2014 | Nagorniak | H04N 21/44008 725/32 |
| 2014/0282795 | A1 * | 9/2014 | Kummer | H04N 21/238 725/116 |

OTHER PUBLICATIONS

English Text Translation of First Office Action for Chinese Patent Application 201410067007.5, Chinese Patent Office, First Office Action dated Aug. 3, 2016; 21 pages.
English Text Translation of Chinese Application No. CN 1784898 A, published on Jun. 7, 2006, LG Electronics Inc.; 10 pages.
Chinese Patent Application 201410067007.5, Chinese Patent Office, Second Office Action dated Mar. 22, 2017; 19 pages.
English Text Translation of Second Office Action for Chinese Patent Application 201410067007.5, Chinese Patent Office, Second Office Action dated Mar. 22, 2017; 26 pages.

* cited by examiner

INFORMATION PROCESSING METHOD AND ELECTRONIC APPARATUS

CROSS REFERENCE TO RELATED APPLICATIONS

This application claims the benefit under 35 U.S.C. § 119(a) of Chinese Patent Application No. 201410067007.5, filed on Feb. 26, 2014, the disclosure of which is incorporated by reference herein in its entirety.

BACKGROUND

The present invention relates to the field of electronic technology, and particularly relates to an information processing method and an electronic apparatus.

With the progressive development of science and technology, electronic technology has developed rapidly with electronic products becoming more and more diversified. People enjoy various kinds of convenience brought by this development, such as a comfortable life by using various kinds of these electronic products.

In the prior arts, the user can watch video by using a computer, a pad, or a smart phone. When watching a lengthy television drama, the user may want to fast-forward, for example, by operation of sliding rightwards or clicking a fast-forward button on a touch control screen.

However, the inventor of this application found that the above-described technology has the following technical problems in the procedure of implementing the technical solutions of the embodiments of this application:

In the prior arts, the process of fast-forward or fast-rewind to the video is in units of a period of time, for example one fast-forward is in units of 5 seconds. When the user clicks the fast-forward button, the video skips to a picture played 5 seconds later.

Therefore, when a multimedia file having a certain time length of playing is played in the prior arts, there is a technical problem that skip can only be carried out in fixed time lengths so that implementation mode is not optimized.

SUMMARY

The embodiments of this application solve the technical problem that in the skip function, which can only be carried out in a fixed time length so that the implementation mode is not optimized when the multimedia file having a certain time length of playing is played. The embodiments of this application solve this problem by providing an information processing method and an electronic apparatus.

The embodiment of this application provides an information processing method applied in an electronic apparatus, which is able to play first data having a time length of playing. The method includes deciding whether a first condition is satisfied when the electronic apparatus plays the first data; switching from a first moment of the first data to a second moment of the first data if result of decision indicates that the first condition is satisfied, the second moment and the first moment constituting a first time interval; deciding whether a second condition is satisfied; and switching from a third moment of the first data to a fourth moment of the first data if result of decision indicates that the second condition is satisfied, the fourth moment and the third moment constituting a second time interval; wherein the first condition is the same as the second condition, and the first time interval is different from the second time interval.

Optionally, when the electronic apparatus plays the first data, the method further includes receiving a first operation by the electronic apparatus; deciding whether the first condition is satisfied is specifically deciding whether the first operation is a preset operation.

Optionally, the first data includes M second data having a time length of playing, and M is a positive integer; deciding whether the first condition is satisfied specifically includes deciding whether playing of current second data is completed.

Optionally, the first data includes M second data having a time length of playing, and M is a positive integer; switching from the first moment of the first data to the second moment of the first data is specifically switching from the first moment of the Pth second data to the second moment of the Qth second data; switching from the third moment of the first data to the fourth moment of the first data is specifically switching from the third moment of the Rth second data to the fourth moment of the Sth second data; wherein, P, Q, R, and S are each positive integers less than or equal to M and different from each other.

Optionally, the first data includes a preset identification; the identification includes information of the first data, and switching from the first moment of the first data to the second moment of the first data is specifically switching the first moment of the first data to the second moment when a first identification is; or switching from the first moment when a second identification is to the second moment when a third identification is; switching from the third moment of the first data to the fourth moment of the first data is specifically switching from the third moment of the first data to the fourth moment when a fourth identification is; or switching from the third moment when a fifth identification is to the fourth moment when a sixth identification is.

Optionally, the first data is a video file, and the identification is preset in a video frame of the video file.

Optionally, the preset identification is obtained by the following steps acquiring the information of the first data by a first mode; setting identification for the first data according to the information of the first data.

Optionally, acquiring the information of the first data by the first mode specifically includes acquiring first information of the first data through network; setting the identification for the first data according to the information of the first data specifically includes determining a position matched with the first information in the first data; and setting the identification at the position matched with the first information.

Optionally, when the first data is the video file, acquiring the information of the first data by the first mode specifically includes acquiring first image information of the video file by screen-cut; setting the identification for the first data according to the information of the first data specifically includes determining a position setting identification matched with the first image information in the video file.

Optionally, before switching from the first moment of the first data to the second moment of the first data, the method further includes determining an identification which is compliant with a third condition; wherein, the first identification, the second identification, the third identification, the fourth identification, the fifth identification and the sixth identification are all identifications which are compliant with the third condition.

Optionally, before the electronic apparatus plays the first data, the method further includes determining target segment data of the first data that the user needs to browse; buffering or downloading the target segment data in advance when the user browses the first data on line or downloads the first data through the network.

The present invention further provides an electronic apparatus, which is able to play a first data having a time length of playing. The electronic apparatus includes a first deciding unit for deciding whether the first condition is satisfied when the electronic apparatus plays the first data; a first processing unit for switching from a first moment of the first data to a second moment of the first data if result of decision indicates that the first condition is satisfied, the second moment and the first moment constituting a first time interval; a second deciding unit for deciding whether a second condition is satisfied; and a second processing unit for switching from a third moment of the first data to a fourth moment of the first data if result of decision indicates that the second condition is satisfied, the fourth moment and the third moment constituting a second time interval; wherein the first condition is the same as the second condition, and the first time interval is different from the second time interval.

Optionally, the electronic apparatus further includes a receiving unit for receiving a first operation by the electronic apparatus; and the first deciding unit is specifically for deciding whether the first operation is a preset operation.

Optionally, the first data includes M second data having a time length of playing, and M is a positive integer; the first deciding unit specifically further for deciding whether playing of current second data is completed.

Optionally, the first data includes M second data having a time length of playing, and M is a positive integer; the first processing unit is specifically for switching from the first moment of the Pth second data to the second moment of the Qth second data; the second processing unit is specifically for switching from the third moment of the Rth second data to the fourth moment of the Sth second data; wherein P, Q, R, and S are each positive integers less than or equal to M and different from each other.

Optionally, the first data includes a preset identification; the identification includes information of the first data; the first processing unit is further specifically for switching from the first moment of the first data to the second moment when a first identification is; or switching from the first moment when a second identification is to the second moment when a third identification is; the second processing unit is further specifically for switching from the third moment of the first data to the fourth moment when a fourth identification is; or switching from the third moment when a fifth identification is to the fourth moment when a sixth identification is.

Optionally, the first data is a video file, and the identification is preset in a video frame of the video file.

Preferably, the electronic apparatus further includes an acquiring unit for acquiring information of the first data by a first mode; a third processing unit for setting identification for the first data according to the information of the first data.

Optionally, the acquiring unit is specifically for acquiring first information of the first data through network; and the third processing unit is specifically for determining a position matched with the first information in the first data; setting the identification at the position matched with the first information.

Optionally, when the first data is a video file, the acquiring unit is further specifically for acquiring first image information of the video file by screen-shot; and the third processing unit is further specifically for determining a position setting identification matched with the first image information in the video file.

Optionally, before switching from the first moment of the first data to the second moment of the first data, the electronic apparatus further includes a first determining unit for determining an identification which is compliant with a third condition; wherein the first identification, the second identification, the third identification, the fourth identification, the fifth identification and the sixth identification are all identifications which are compliant with the third condition.

Optionally, before the electronic apparatus plays the first data, the electronic apparatus further includes a second determining unit for determining target segment data of the first data that the user needs to browse; a fourth processing unit for buffering or downloading the target segment data in advance when the user browses the first data on line or downloads the first data through network.

One or more technical solutions provided by the embodiments of this application at least have the following technical effects or advantages:

That the first condition is satisfied is indicated by the result of decision, the first moment of the first data is switched to the second moment of the first data, and the second moment and the first moment constitute the first time interval, and that the second condition is satisfied is indicated by the result of decision, the third moment of the first data is switched to the fourth moment of the first data, and the fourth moment and the third moment constitute the second time interval, the first time interval is different from the second time interval, and the first condition is the same as the second condition. Thus, the technical problem that the skip can only be carried out in a fixed time length and the implementation mode is not optimized when the multimedia file having a certain time length of playing is played in the prior arts is solved, and technical effect of being able to skip in a non-fixed time length and optimizing the implementation mode is obtained.

BRIEF DESCRIPTION OF THE DRAWINGS

In order to explain the technical solution in the embodiments of the present invention more clearly, the accompanying drawings need to be used in the description of the embodiments or the prior arts are described simply, it is obvious that the accompanying drawings in the following description are only embodiments of the present invention and, for those skilled in the art, other accompanying drawings can be obtained according to provided accompanying drawings without inventive labor.

DETAILED DESCRIPTION

Figure 1:
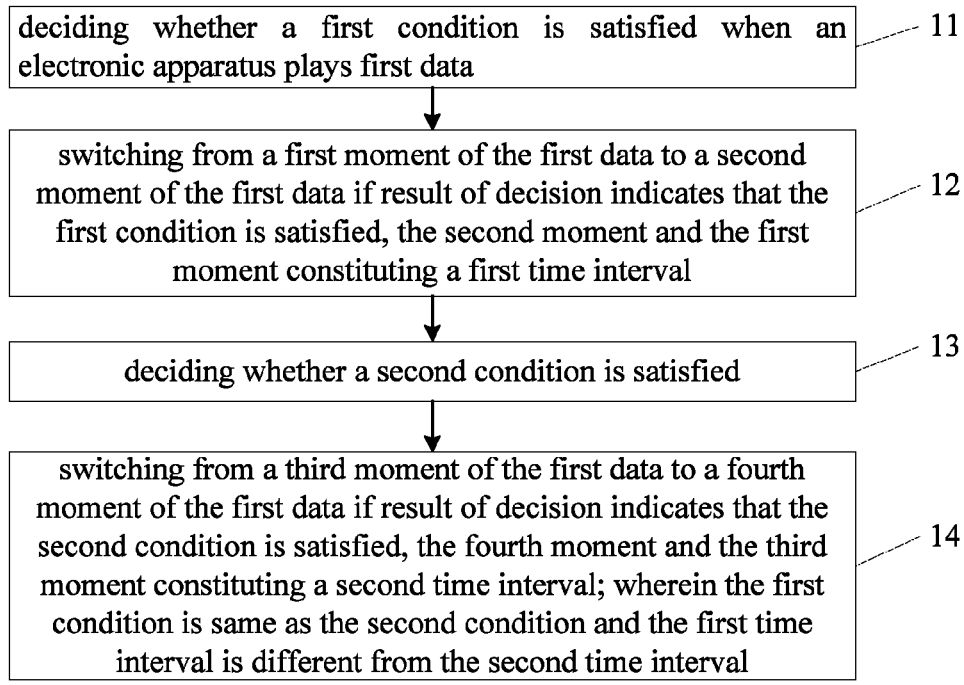
FIG. 1 is a flow chart of an embodiment of an information processing method of the present invention.

In order to make the purpose, the technical solution and the advantage of this application more clear and understandable, the technical solutions in the embodiments of the present invention are described clearly and integrally in combination with the accompanying drawings in the embodiments of the present invention as follows. It is obvious that the embodiments described are only some, rather than all, of the present invention. All of the other embodiments obtained by those skilled in the art without inventive labor based on the embodiments in the present invention belong to a range sought for protection of the present invention. Embodiments and features in the embodiments of this application can be combined arbitrarily with each other without conflicting. Steps shown in the flow chart in the accompanying drawings can be executed in a computer system such as a set of computer executable instructions. And, though a logical sequence is shown in the flow chart, in certain cases the steps shown or described can be executed in a sequence, which is different from the sequence here.

The embodiments of this application solve the technical problem that a skip can only be carried out in a fixed time length and the implementation mode is not optimized when a multimedia file having a certain time length of playing is played in the prior arts. This application obtains the technical effect of being able to skip in a non-fixed time length and optimize the implementation mode by providing the information processing method and the electronic apparatus.

The overall concept of the technical solution in the embodiments of this application for solving the above technical problem is as follows:

One embodiment of the present invention provides an information processing method applied in an electronic apparatus, which is able to play a first data having a time length of playing. The method includes deciding whether a first condition is satisfied when the electronic apparatus plays the first data; switching from a first moment of the first data to a second moment of the first data if result of decision indicates that the first condition is satisfied, the second moment and the first moment constituting a first time interval; deciding whether a second condition is satisfied; and switching from a third moment of the first data to a fourth moment of the first data if result of decision indicates that the second condition is satisfied, the fourth moment and the third moment constituting a second time interval; wherein the first condition is the same as the second condition, and the first time interval is different from the second time interval.

In order to understand the above-described technical solution better, the main implementation principle, the specific implementation mode and the corresponding advantageous effect of the technical solutions of the embodiment of this application are described in detail in combination with the accompanying drawings as follows.

Embodiment One

With reference to FIG. 1, one embodiment of the present invention provides an information processing method applied in an electronic apparatus, and the electronic apparatus may be a computer, a pad, or a smart phone or the like. The electronic apparatus can play a first data having a time length of playing. Here, the first data may be a video file, for example, movie video, television drama video or the like. Of course, the first data may also be an audio file, for example a music file or the like. The method includes:

Step 11: deciding whether a first condition is satisfied when the electronic apparatus plays the first data.

Step 12: switching from a first moment of the first data to a second moment of the first data if result of decision indicates that the first condition is satisfied, the second moment and the first moment constituting a first time interval.

Step 13: deciding whether a second condition is satisfied.

Step 14: switching from a third moment of the first data to a fourth moment of the first data if result of decision indicates that the second condition is satisfied, the fourth moment and the third moment constituting a second time interval; wherein the first condition is the same as the second condition, and the first time interval is different from the second time interval.

In particular, the second moment may be before the first moment and may be after the first moment, the fourth moment may be before the third moment and may be after the third moment, i.e. the switching includes switching of forward type or switching of backward type.

In step 11, deciding whether the first condition is satisfied includes, but is not limited to, the following two cases:

(1) In this embodiment, when the electronic apparatus plays the first data, the method further includes receiving a first operation by the electronic apparatus. Then, in step 11, deciding whether the first condition is satisfied is specifically deciding whether the first operation is a preset operation.

In the specific implementation procedure, receiving the first operation by the electronic apparatus may be receiving a touch control operation by the electronic apparatus through a touch control display unit, or may be receiving an operation, in which the user clicks a keyboard by the electronic apparatus. Of course, it may be detecting a gesture or the like of the user in the air by the electronic apparatus through infrared ray, and this application does not make any specific restriction thereto. Deciding whether the first operation is a preset operation may be deciding whether the first operation is clicking a switch key on an interface of playing the first data (the switch key may be displayed in a video playing page all the time or displayed by trigger or replace the conventional fast-forward button) or may be deciding whether the first operation is a slide operation in a preset direction on the touch control display unit by the user, for example a slide operation from left to right; or may be deciding whether the first operation is a slide gesture in the air by the user. Of course, it may also be deciding whether the first operation is clicking a corresponding key of the keyboard, for example an upward key, a downward key, a leftward key or a rightward key, by the user. Preferably, the user can set the preset operation according to his own preference in the system of the electronic apparatus or the system of the player. Further, the user may select a moment when he wants to browse the first data by himself according to execution of some of the preset operations, so that the first data is switched from the first moment to the second moment of the first data he has selected himself. With this method, the user can switch the first data to the moment that he wants to watch at the time of executing the preset operation, which improves the user's experience.

(2) In this embodiment, the first data includes M second data having a time length of playing, and M is a positive integer; then, in step 11, deciding whether the first condition is satisfied specifically includes deciding whether playing of current second data is completed.

In the specific implementation procedure, the M second data may be M segment data included in the first data, for example, in a movie video file, a plurality of video segments of a snow scene are included. At this time, deciding whether playing of the current second data is completed is specifically deciding whether playing of the current segment data is completed. The M second data may also be M files included in the first data, for example the first data includes M different song files. At this time, deciding whether playing of the current second data is completed is specifically deciding whether the playing of the current file is completed. When playing of the current second data is completed, the first moment of the first data is switched to the second moment of the first data. At this time, the second moment of the first data is a start moment of the next second data, for example, when the user selects a segment of the snow scene in a movie as the video segment that he wants to watch, i.e. the second data having the snow scene, the first data is switched to the next second data having the snow scene automatically after playing of the current second data having the snow scene is completed. With this method, an operation of watching a target data segment by the user is omitted, which improves efficiency of watching the target data segment by the user.

In particular, in step 12 and step 14, switching from the first moment of the first data to the second moment of the first data and switching from the third moment of the first data to the fourth moment of the first data specifically include but are not limited to the following two cases:

(1) In this embodiment, the first data includes the M second data having the time length of playing, and M is a positive integer; switching from the first moment of the first data to the second moment of the first data is specifically switching from the first moment of the Pth second data to the second moment of the Qth second data; switching from the third moment of the first data to the fourth moment of the first data is specifically switching from the third moment of the Rth second data to the fourth moment of the Sth second data; wherein P, Q, R, and S are each positive integers less than or equal to M and different from each other.

Wherein the first data including the M second data having the time length of playing means that the first data includes M files having a time length of playing, for example, M video files or M song files. There may also be M file segments included in the same file, for example M video segments with actor A appearing included in the video file. A specific example is described by taking the second data as the song file as follows the first data includes 10 song files, and, when the user enjoys music in a certain playing sequence, the 10 songs constitute a unified time length of playing; switching from the first moment of the first data to the second moment of the first data is specifically switching from the first moment of the second song file to the second moment of the fifth song file, and the second moment may be the beginning of the fifth song. And switching from the third moment of the first data to the fourth moment of the first data is specifically switching from the third moment of the sixth song file to the fourth moment of the eighth song file, and the fourth moment may be the beginning of the eighth song. Thus, when the user listens to a song, songs can be selected according to a preset condition by the user; for example, if the user only likes to listen to song singing in female voice, then the song singing in male voice in a song list is skipped automatically at the time of cutting songs, and only the song singing in female voice is played, which improves the user's experience.

(2) In this embodiment, the first data includes the preset identification, the identification includes the information of the first data, and switching from the first moment of the first data to the second moment of the first data is specifically switching the first moment of the first data to the second moment when the first identification is; or switching from the first moment when the second identification is to the second moment when the third identification is; switching from the third moment of the first data to the fourth moment of the first data is specifically switching from the third moment of the first data to the fourth moment when the fourth identification is; or switching from the third moment when the fifth identification is to the fourth moment when the sixth identification is.

Here, the information of the first data included in the identification may be character information included in the first data, for example names of all actors in a movie or name of author of a song; or may also be information of scenes; or may also be abstract information of a certain picture in the video; or may also be caption information in a movie; or may also be time information of appearance of a certain character in a movie or the like. The identification may be displayed in an interface playing the first data, for example a specific identification is displayed on a progress bar of a video playing interface; when the user moves a mouse or a finger to a certain identification, an information box is displayed at this identification, and the information box may only display the position of the moment where the identification is in the data. The information box may also display a displaying position of the moment where the identification is in the data and thumbnail of data picture at the moment and abstract on the thumbnail and/or data content at the moment. Of course, the identification also may not be displayed in the interface playing the first data, for example all identifications are not displayed in the playing interface, or identifications, which are compliant with predetermined conditions selected are displayed in the playing interface, and identifications, which are not compliant with predetermined conditions, are not displayed in the playing interface. Thus, the user may better understand data information that he wants to watch through the identifications, which improves the user's experience.

Optionally, the first data is the video file, and the identification is preset in a video frame of the video file. In the specific implementation procedure, when the video file includes a plurality of video segments, the identification may be set in a frame included in a certain video segment in advance. The identification may also be set in a plurality of frames included in the video file in advance. For example, the identifications are set in each frame of a certain video segment in advance. By setting the identification in the video frame so that detailed information of each video frame of the video is known by the user, when the user wants to watch the video segment that he wants by himself, the video segment that he wants by himself can be obtained accurately by selecting the identification in the video frame which is compliant with the conditions, which improves the user's experience.

Optionally, the time length of playing of the first data includes a plurality of time periods; the identifications can be set at the beginning and/or end of a certain time period in advance; they may also be set in the entire time period in advance.

Optionally, the time length of playing of the first data includes a plurality of video frames, and the identifications may be set at a start frame and/or an end frame of the time length of the video in advance. Or the identifications may also be set in all video frames in the entire time length of playing of the video in advance.

Optionally, the preset identification is obtained by the following steps: acquiring the information of the first data by the first mode; and setting identification for the first data according to the information of the first data.

Wherein acquiring the information of the first data by the first mode includes but is not limited to the following two cases:

(1) In this embodiment, acquiring the information of the first data by the first mode specifically includes acquiring the first information of the first data through network; then setting the identifications for the first data according to the information of the first data specifically includes determining the position matched with the first information in the first data; and setting the identification at the position matched with the first information.

In the specific implementation procedure, acquiring the first information of the first data through network may be downloading images related to the first data through network, searching a head portrait of an actor in a certain movie through network, searching a position of appearance of the actor in the video by face recognition technique and setting the identification at this position of appearance. Of course, acquiring the first information of the first data through network may also be acquiring the first information of the first data by manner of searching pictures with a keyword through network. With this method, the electronic apparatus can set the identifications for the first data automatically according to the first information of the first data, which improves efficiency of data processing.

(2) In this embodiment, when the first data is the video file, acquiring the information of the first data by the first mode specifically includes acquiring first image information of the video file by screen-shot; then setting the identifications for the video file according to the information of the video file specifically includes determining a position setting identification matched with the first image information in the video file.

Wherein, when a plurality of successive images match with the first image information in the video file, determining the position setting identification matched with the first image information in the video file may be setting identifications at a position of the first image and/or a position of the last image in the plurality of successive images, and may also be setting the identifications at positions of each image in the plurality of successive images. For example, when the user watches a movie, he finds that the snow scenes are very beautiful and presses a screen-shot key at the moment of the snow scene watched currently. The electronic apparatus sets an identification at a segment of the snow scene by analyzing the information of the screen-shot. The identification may be set at the position of the first image where a certain segment of the snow scene starts and/or the position of the last image, and may also be set at the positions of each image included in the segment of the snow scene. With this method, the user may set the identification according to his own preference at any time in the procedure of browsing the first data, which improves the user's experience.

Optionally, before switching from the first moment of the first data to the second moment of the first data, the method further includes determining an identification which is compliant with a second condition; wherein the first identification, the second identification, the third identification, the fourth identification, the fifth identification and the sixth identification are all identifications which are compliant with the second condition.

Figure 2:
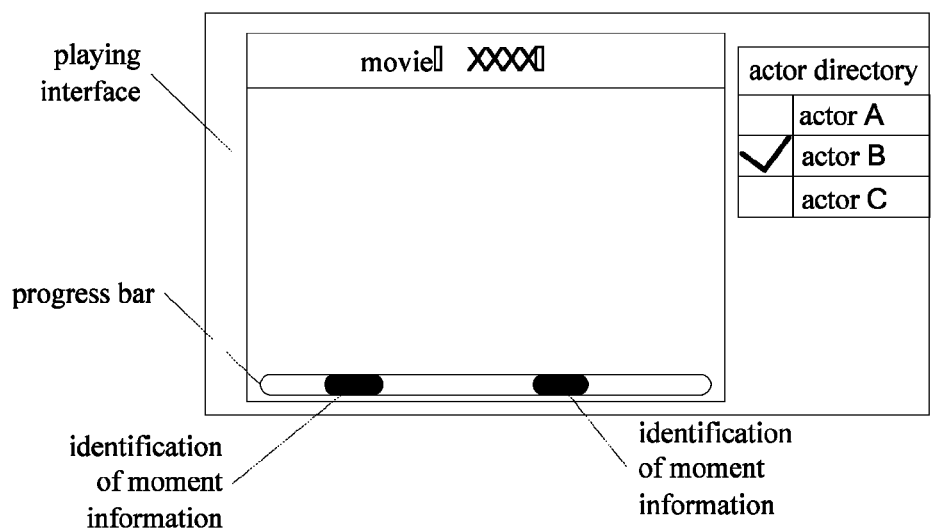
FIG. 2 is a schematic diagram of determining the identification, which is compliant with the second condition in one embodiment of the present invention.

In the specific implementation procedure, determining the identification, which is compliant with the second condition, may be selecting the identification including a certain specific scene and/or a certain specific character. Of course, it may also be selecting the identification of a certain specific time period. After determining the identification, which is compliant with the second condition, the first data switches between the identifications, which are compliant with the second condition. Hereinafter, a specific example is described, with reference to FIG. 2, the first data is a movie "XXXX" and this movie has actors A, B, and C, and an actor directory and a progress bar are displayed in an interface of a player playing the movie. When the user only wants to watch segments of the actor B, he can select the actor B in the actor directory, and at this time identification of moment information of appearance of the actor B in the movie is displayed in the progress bar. When the user clicks the switch key, the player switches from the current playing moment of the movie to the next moment with the identification of moment information to start to play. Preferably, after the user selects the actor B in the actor directory, the player only plays segments including scenes, in which the actor B appears. Of course, in the specific implementation procedure, the user may also search the actor B directly in a search box of the playing interface, and then the moment information of the appearance of the actor B is displayed, and the user is prompted whether to set identification at the moment of the appearance of the actor B. Or, when the user searches the actor B in the search box of the playing interface, the electronic apparatus sets identification at the moment of the appearance of the actor B automatically. With this method, the user may select the identification set at the segment of the data that he wants to browse by himself, so that the first data only switches between these identifications, which improves the user's experience.

Optionally, before the electronic apparatus plays the first data, the method further includes determining target segment data of the first data that the user needs to browse; and buffering or downloading the target segment data in advance when the user browses the first data on line or downloads the first data through network.

In the specific implementation procedure, determining the target segment data of the first data that the user needs to browse may be by using a browse history of the user. For example, a recent browse record of a certain user has movies A, B and C, and an actor Z has performed in the three movies. When the user watches a movie D in which the actor Z performs on line, it determines that the target segment data of the first data that the user needs to browse is a segment of appearance of the actor Z in the movie D, and at this time the electronic apparatus buffers the segment of appearance of the actor Z in the movie D in advance. Of course, in practical applications, determining the target segment data of the first data that the user needs to browse may also be selecting the target segment data of the first data by an operation of the user, for example selecting an actor in the actor directory shown in FIG. 2 and determining that the target segment data is the segment of appearance of the actor in the movie. By buffering or downloading the target segment data in advance, the user is able to browse content that he wants to watch faster, so this solution is more humanized, which improves the user's experience.

Optionally, at the time of switching the first data, the first time interval being different from the second time interval may include but is not limited to the following cases. The second time interval is 0, i.e. a second time switch is not generated. For example, when there is only one identification, the first data is only skipped to switch once. The second time interval is a fixed time interval, for example, when there is only one identification, after the first data is skipped to switch for the first time, when the user presses the switch key again, the first data is switched according to the conventional fast-forward mode; for example, the data is fast-forwarded in units of 5 seconds. With this method, a compatible effect between the technical solution of this application and the conventional technical solution of fast-forward is implemented.

Optionally, the identification may be set at server side, and may also be set by the user himself, or may also be set by the user and then uploaded to the server to be downloaded and used by other users. Label information of the video may be included in the identification, or comment information of the user for the video is included, and the user can modify the labeled information and upload it to the server, to implement diversification of the video identification and information. When the video provider does not have sufficient energy to maintain the video, labeling, sharing and error correction of the video information are implemented by integrating the power of the user, which improves the quality of the label of the video information and the user's experience of watching the video.

Further, a specific user may be given a particular authority to limit the annotation authority of a malicious user when the malicious user adds identification and annotation out of orders, so that the identification is more accurate and the information is of greater value.

Optionally, when the user completes the playing of the content currently identified, the user may select displaying the identification separately, displaying the identification and corresponding information or displaying the identification and/or information when the user triggers. The user may also delete his own related identification after completing watching the video segment labeled by the identification.

Embodiment Two

Figure 3:
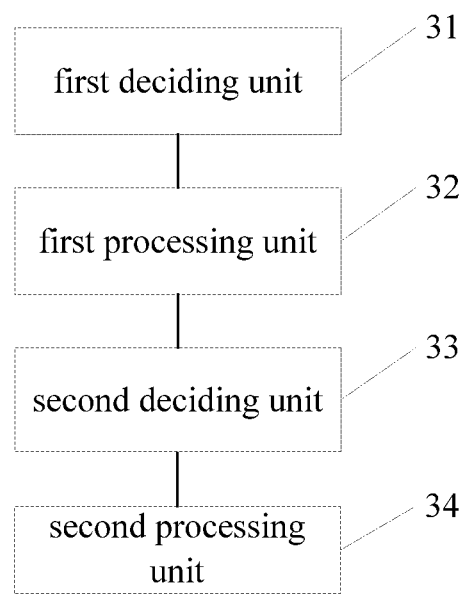
FIG. 3 is a functional block diagram of an embodiment of an electronic apparatus of the present invention.

Based on the same inventive concept, one embodiment of the present invention further provides an electronic apparatus, which is able to play a first data having a time length of playing. As shown in FIG. 3, the electronic apparatus includes a first deciding unit 31 for deciding whether a first condition is satisfied when the electronic apparatus plays the first data; a first processing unit 32 for switching from a first moment of the first data to a second moment of the first data if result of decision indicates that the first condition is satisfied, the second moment and the first moment constituting a first time interval; a second deciding unit 33 for deciding whether a second condition is satisfied; a second processing unit 34 for switching a third moment of the first data to a fourth moment of the first data if the result of decision indicates that the second condition is satisfied, the fourth moment and the third moment constituting the second time interval; wherein the first condition is the same as the second condition, and the first time interval is different from the second time interval.

Optionally, the electronic apparatus further includes a receiving unit for receiving a first operation by the electronic apparatus; the first deciding unit 31 is specifically for: deciding whether the first operation is a preset operation.

Optionally, the first data includes M second data having a time length of playing, and M is a positive integer; the first deciding unit 31 is specifically further for deciding whether current second data is completed playing.

Optionally, the first data includes the M second data having the time length of playing, and M is a positive integer; the first processing unit 32 is specifically for switching from the first moment of the Pth second data to the second moment of the Qth second data; the second processing unit 34 is specifically for switching from the third moment of the Rth second data to the fourth moment of the Sth second data; wherein P, Q, R, and S are each positive integers less than or equal to M and different from each other.

Optionally, the first data includes a preset identification; the identification includes information of the first data, the first processing unit 32 is further specifically for switching from the first moment of the first data to the second moment when a first identification is; or switching from the first moment when a second identification is to the second moment when a third identification is; the second processing unit 34 is further specifically for switching from the third moment of the first data to the fourth moment when a fourth identification is; or switching from the third moment when a fifth identification is to the fourth moment when a sixth identification is.

Optionally, the first data is a video file, and the identification is preset in a video frame of the video file.

Optionally, the electronic apparatus further includes an acquiring unit for acquiring information of the first data by a first mode; and a third processing unit for setting identification for the first data according to the information of the first data.

Optionally, the acquiring unit is specifically for acquiring first information of the first data through network; the third processing unit is specifically for determining a position matched with the first information in the first data; and setting the identification at the position matched with the first information.

Optionally, when the first data is a video file, the acquiring unit is further specifically for acquiring first image information of the video file by screen-shot; the third processing unit is further specifically for determining a position setting identification matched with the first image information in the video file.

Optionally, before switching from the first moment of the first data to the second moment of the first data, the electronic apparatus further includes a first determining unit for determining an identification, which is compliant with a third condition; wherein the first identification, the second identification, the third identification, the fourth identification, the fifth identification and the sixth identification are all identifications which are compliant with the third condition.

Optionally, before the electronic apparatus plays the first data, the electronic apparatus further includes a second determining unit for determining target segment data of the first data that the user needs to browse; and a fourth processing unit for buffering or downloading the target segment data in advance when the user browses the first data on line or downloads the first data through network.

The electronic apparatus in the embodiment two and the information processing method in the previous FIG. 1 and the respective modified embodiments thereof are inventions based on the same idea. By the previous detailed description of the information processing method and the various modifications thereof, those skilled in the art can understand the implementation procedure of the electronic apparatus in the present embodiment clearly, and is it no longer described here for simplicity of the specification.

At least the following technical effects can be implemented by one embodiment or a plurality of embodiments of the above embodiments of the present invention:

That the first condition is satisfied is indicated by the result of decision, the first moment of the first data is switched to the second moment of the first data, and the second moment and the first moment constitute the first time interval, and that the second condition is satisfied is indicated by the result of decision, the third moment of the first data is switched to the fourth moment of the first data, the fourth moment and the third moment constitute the second time interval, the first time interval is different from the second time interval, and the first condition is the same as the second condition. Thus, the technical problem that the skip can only be carried out in a fixed time length and the implementation mode is not optimized when the multimedia file having a certain time length of playing is played in the prior arts is solved, and the technical effect of being able to skip in non-fixed time length and optimizing the implementation mode is obtained.

Those skilled in the art should understand that the embodiments of the present invention can be provided as method, system, or computer program product. Therefore, the present invention can adopt forms of full hardware embodiment, full software embodiment, or embodiment combining software and hardware aspects. And the present invention can adopt the form of one or more computer program products implemented on a computer usable storage medium (including but not limited to a magnetic disk storage, a CD-ROM, an optical memory or the like) including computer usable program code.

The present invention is described by referring to the flow chart and/or the block diagram of method, apparatus (system) and computer program product according to the embodiments of the present invention. It should be understood that each flow and/or block in the flow chart and/or block diagram and the combination of the flow and/or block in the flow chart and/or block diagram can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow chart and/or one or more blocks of the block diagram is generated by the instructions executed by the processor of the computer or other programmable apparatus.

These computer program instructions can also be stored in a computer readable storage which is able to direct the computer or other programmable data processing apparatus to operate in specific manners, so that the instructions stored in the computer readable storage generate a manufactured article including a commander equipment; the commander equipment implements functions specified by one or more flows in the flow chart and/or one or more blocks in the block diagram.

These computer program instructions can be loaded to the computer or other programmable data processing apparatus, so that a series of operation steps is executed on the computer or other programmable apparatus to generate computer implemented processes, so that the instructions executed on the computer or other programmable apparatus provide steps for implementing functions specified in one or more flows of the flow chart and/or one or more blocks of the block diagram.

In particular, the embodiment of this application provides the information processing method applied in the electronic apparatus, which is able to play the first data having the time length of playing; computer program instructions corresponding to the information processing method of the embodiment of this application may be stored in a storage medium such as an optical disk, a hard disk, a U disk or the like. When the computer program instructions corresponding to the information processing method in the storage medium is read or executed by an electronic apparatus, it includes the following steps:

Deciding whether the first condition is satisfied when the electronic apparatus plays the first data; switching from the first moment of the first data to the second moment of the first data if the result of decision indicates that the first condition is satisfied, the second moment and the first moment constituting the first time interval; deciding whether the second condition is satisfied; and switching from the third moment of the first data to the fourth moment of the first data if the result of decision indicates that the second condition is satisfied, the fourth moment and the third moment constituting a second time interval; wherein the first condition is the same as the second condition, and the first time interval is different from the second time interval.

Optionally, there are some other computer instructions stored in the storage medium; these computer instructions are steps executed after the computer instructions corresponding to when the electronic apparatus plays the first data are executed, and these computer instructions include the following step at the time of being executed receiving the first operation by the electronic apparatus. There are some other computer instructions stored in the storage medium in the specific execution procedure of the computer instructions corresponding to deciding whether the first condition is satisfied, it specifically includes the following step deciding whether the first operation is a preset operation.

Optionally, the first data includes the M second data having the time length of playing, and M is a positive integer. There are also some other computer instructions stored in the storage medium in the specific execution procedure of the computer instruction corresponding to deciding whether the first condition is satisfied, it specifically includes the following step deciding whether the current second data is completed playing.

Optionally, the first data includes the M second data having the time length of playing, and M is a positive integer. There are also some other computer instructions stored in the storage medium in the specific execution procedure of the computer instruction corresponding to switching from the first moment of the first data to the second moment of the first data, it specifically includes the following step switching from the first moment of the Pth second data to the second moment of the Qth second data. There are also some other computer instructions stored in the storage medium in the specific execution procedure of the computer instruction corresponding to switching from the third moment of the first data to the fourth moment of the first data, it specifically includes the following steps switching from the third moment of the Rth second data to the fourth moment of the Sth second data; wherein P, Q, R, and S are each positive integers less than or equal to M and different from each other.

Optionally, the first data includes the preset identification, and the identification includes the information of the first data. There are also some other computer instructions stored in the storage medium in the specific execution procedure of the computer instruction corresponding to switching from the first moment of the first data to the second moment of the first data, it specifically includes the following step switching from the first moment of the first data to the second moment when the first identification is; or switching from the first moment when the second identification is to the second moment when the third identification is. There are also some other computer instructions stored in the storage medium in the specific execution procedure of the computer instruction corresponding to switching from the third moment of the first data to the fourth moment of the first data, it specifically includes the following steps switching from the third moment of the first data to the fourth moment when the fourth identification is; or switching from the third moment when the fifth identification is to the fourth moment when the sixth identification is.

Optionally, the first data is the video file, and the identification is preset in the video frame of the video file.

Optionally, there are also some other computer instructions stored in the storage medium; these computer instructions are for the preset identification. In the specific execution procedure, the corresponding computer instructions specifically include the following steps acquiring information of the first data by a first mode; and setting the identification for the first data according to the information of the first data.

Optionally, there are also some other computer instructions stored in the storage medium in the specific execution procedure, the computer instruction corresponding to acquiring the information of the first data by the first mode specifically includes the following step acquiring the first information of the first data through network. There are also some other computer instructions stored in the storage medium in the specific execution procedure, the computer instruction corresponding to setting the identification for the first data according to the information of the first data specifically includes the following steps determining the position matched with the first information in the first data; and setting the identification at the position matched with the first information.

Optionally, there are also some other computer instructions stored in the storage medium in the specific execution procedure, the computer instruction corresponding to acquiring the information of the first data by the first mode specifically includes the following step acquiring the first image information of the video file by screen-shot. In the specific execution procedure, the computer instruction corresponding to setting the identification for the first data according to the information of the first data specifically includes the following step determining the position setting identification matched with the first image information in the video file.

Optionally, there are also some other computer instructions stored in the storage medium; these computer instructions are steps executed before the computer instruction corresponding to switching from the first moment of the first data to the second moment of the first data is executed, and they include the following step at the time of being executed determining the identification which is compliant with the third condition. Wherein the first identification, the second identification, the third identification, the fourth identification, the fifth identification and the sixth identification are all identifications, which are compliant with the third condition.

Optionally, there are also some other computer instructions stored in the storage medium; these computer instructions are steps executed before the computer instructions corresponding to playing the first data by the electronic apparatus are executed and include the following steps at the time of being executed determining target segment data of the first data that the user needs to browse; and buffering or downloading the target segment data in advance when the user browses the first data on line or downloads the first data through network.

It is obvious that those skilled in the art can make various kinds of modifications and variations to the present invention without departing from the spirit and scope of the present invention. Thus, if these modifications and variations of the present invention fall within the scope of the claims of the present invention and the equivalent technology, the present invention intends to incorporate these modifications and variations.

What is claimed is:

1. An information processing method applied in an electronic apparatus which is able to play a first data having a time length of playing, the method comprising:

deciding whether the first condition is satisfied when the electronic apparatus plays the first data, the first condition being for triggering switching of a playing moment of the first data;

automatically switching from a first moment of the first data to a second moment of the first data if result of the decision indicates that the first condition is satisfied, the second moment and the first moment constituting a first time interval;

deciding whether a second condition is satisfied, the second condition being for triggering switching of a playing moment of the first data; and automatically switching from a third moment of the first data to a fourth moment of the first data if result of the decision indicates that the second condition is satisfied, the fourth moment and the third moment constituting a second time interval;

wherein the first condition is the same as the second condition, and time length of the first time interval is different from time length of the second time interval.

2. The method of claim 1, wherein when the electronic apparatus plays the first data, the method further including:
receiving a first operation by the electronic apparatus; and
deciding whether the first condition is satisfied specifically includes deciding whether the first operation is a preset operation.

3. The method of claim 1, wherein the first data includes M second data having a time length of playing and M is a positive integer, and deciding whether the first condition is satisfied specifically includes deciding whether current second data is completed playing.

4. The method of claim 1, wherein the first data includes M second data having a time length of playing and M is a positive integer, and switching from the first moment of the first data to the second moment of the first data is specifically:
switching from the first moment of the Pth second data to the second moment of the Qth second data; and
switching from the third moment of the first data to the fourth moment of the first data and the fourth moment and the third moment constituting the second time interval is specifically:
switching from the third moment of the Rth second data to the fourth moment of the Sth second data;
wherein P, Q, R, and S are each positive integers less than or equal to M and different from each other.

5. The method according to claim 1, wherein the first data includes a preset identification, the identification includes information of the first data, and switching from the first moment of the first data to the second moment of the first data is specifically:
switching from the first moment of the first data to the second moment at which a first identification is; or
switching from the first moment at which a second identification is to the second moment at which a third identification is; and
switching from the third moment of the first data to the fourth moment of the first data is specifically:
switching from the third moment of the first data to the third moment at which a fourth identification is; or
switching from the third moment at which a fifth identification is to the fourth moment at which a sixth identification is.

6. The method of claim 5, wherein the first data is a video file and the identification is preset in a video frame of the video file.

7. The method of claim 5, wherein the preset identification is obtained by:
  acquiring information of the first data by a first mode; and
  setting identification for the first data according to the information of the first data.

8. The method of claim 7, wherein acquiring the information of the first data by the first mode specifically includes:
  acquiring the first information of the first data through network; and
  setting the identification for the first data according to the information of the first data specifically includes:
  determining a position matched with the first information in the first data; and
  setting the identification at the position matched with the first information.

9. The method of claim 7, wherein when the first data is the video file, acquiring the information of the first data by the first mode specifically includes:
  acquiring first image information of the video file by screen-shot; and
  setting the identification for the first data according to the information of the first data specifically includes:
  determining a position setting identification matched with the first image information in the video file.

10. The method of claim 5, wherein before switching from the first moment of the first data to the second moment of the first data, the method further includes:
  determining an identification which is compliant with a third condition;
  wherein, the first identification, the second identification, the third identification, the fourth identification, the fifth identification and the sixth identification are all identifications which are compliant with the third condition.

11. The method of claim 1, wherein before the electronic apparatus plays the first data, the method further includes:
  determining target segment data of the first data that the user needs to browse; and
  buffering or downloading the target segment data in advance when the user browses the first data on line or downloads the first data through network.

12. An electronic apparatus which is able to play a first data having a time length of playing, the electronic apparatus comprising:
  a first deciding unit for deciding whether a first condition is satisfied when the electronic apparatus plays a first data, the first condition being for triggering switching of a playing moment of the first data;
  a first processing unit for automatically switching from a first moment of the first data to a second moment of the first data if result of decision indicates that the first condition is satisfied, the second moment and the first moment constituting a first time interval;
  a second deciding unit for deciding whether a second condition is satisfied, the second condition being for triggering switching of a playing moment of the first data; and
  automatically a second processing unit for switching from a third moment of the first data to a fourth moment of the first data if result of decision indicates that the second condition is satisfied, the fourth moment and the third moment constituting a second time interval;
  wherein the first condition is the same as the second condition, and time length of the first time interval is different from time length of the second time interval.

13. The electronic apparatus of claim 12, wherein the first data includes M second data having a time length of playing and M is a positive integer, and the first processing unit is specifically for:
  switching from the first moment of the Pth second data to the second moment of the Qth second data; and
  the second processing unit is specifically for:
  switching from the third moment of the Rth second data to the fourth moment of the Sth second data;
  wherein P, Q, R, and S are each positive integers less than or equal to M and different from each other.

14. The electronic apparatus of claim 12, wherein the first data includes a preset identification, the identification includes information of the first data, and the first processing unit is specifically further for:
  switching from the first moment of the first data to the second moment when a first identification is; or
  switching from the first moment when a second identification is to the second moment when a third identification is; and
  the second processing unit is specifically for:
  switching from the third moment of the first data to the third moment when a fourth identification is; or
  switching from the third moment when a fifth identification is to the fourth moment when a sixth identification is.

15. The electronic apparatus of claim 14, wherein the first data is a video file and the identification is preset in a video frame of the video file.

16. The electronic apparatus of claim 14, wherein the electronic apparatus further includes:
  an acquiring unit for acquiring information of the first data by a first mode; and
  a third processing unit for setting identification for the first data according to the information of the first data.

17. The electronic apparatus of claim 16, wherein the acquiring unit is specifically for:
  acquiring the first information of the first data through network; and
  the third processing unit is specifically for:
  determining a position matched with the first information in the first data; and
  setting the identification at the position matched with the first information.

18. The electronic apparatus of claim 16, wherein when the first data is the video file, the acquiring unit is specifically further for:
  acquiring first image information of the video file by screen-shot; and
  the third processing unit is specifically further for:
  determining a position setting identification matched with the first image information in the video file.

19. The electronic apparatus of claim 14, wherein before switching from the first moment of the first data to the second moment of the first data, the electronic apparatus further includes:
  a first determining unit for determining an identification which is compliant with a third condition;
  wherein, the first identification, the second identification, the third identification, the fourth identification, the fifth identification and the sixth identification are all identifications which are compliant with the third condition.

20. The electronic apparatus of claim 12, wherein before the electronic apparatus plays the first data, the electronic apparatus further includes:

a second determining unit for determining target segment data of the first data that the user needs to browse; and a fourth processing unit for buffering or downloading the target segment data in advance when the user browses the first data on line or downloads the first data through network.

\* \* \* \* \*